April 25, 1961  H. P. HEISIG ET AL  2,980,914
COMBINED HEADGEAR AND EYESHIELD
Filed June 3, 1959  3 Sheets-Sheet 1

INVENTORS
H. PHILIP HEISIG
EVERETT R. PRICE

BY Harmon, Pierce & Kurz

ATTORNEY

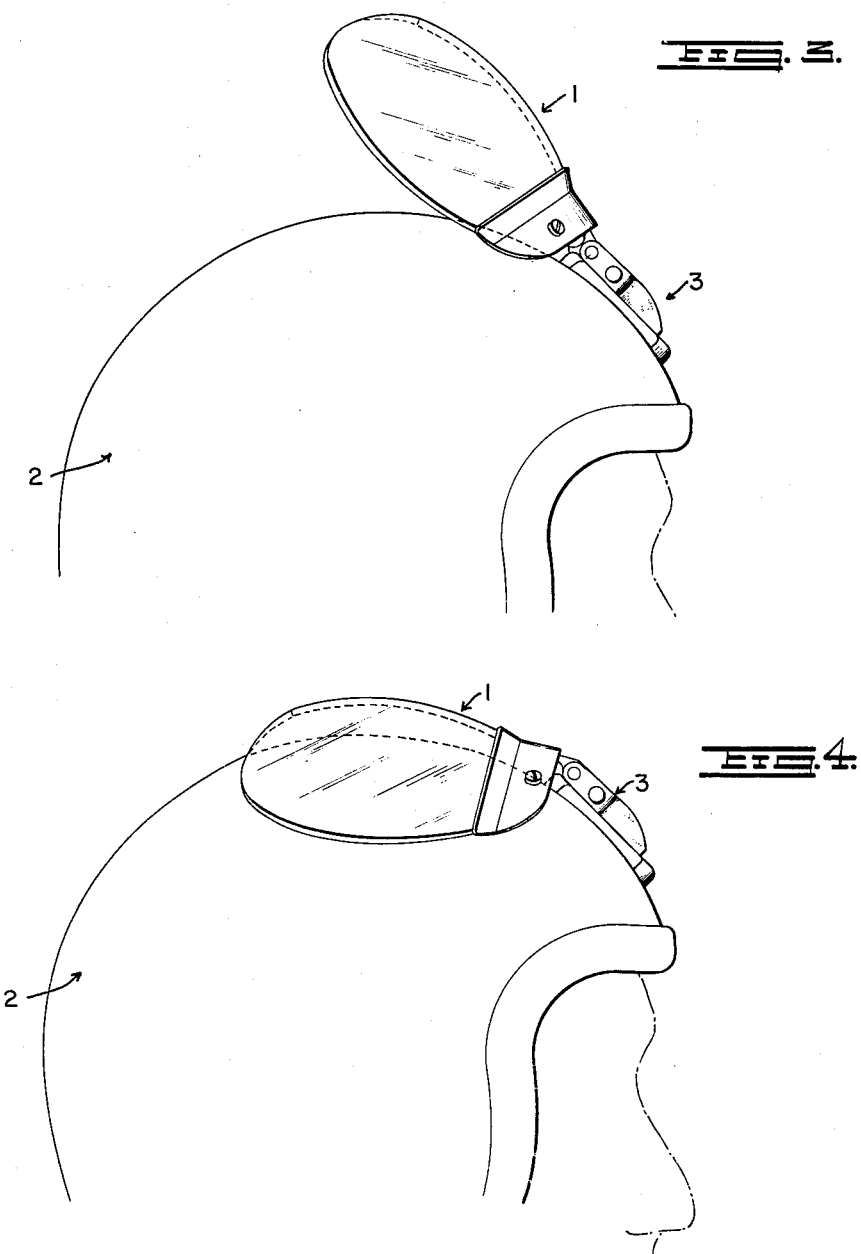

April 25, 1961 H. P. HEISIG ET AL 2,980,914
COMBINED HEADGEAR AND EYESHIELD
Filed June 3, 1959 3 Sheets-Sheet 3

INVENTORS
H. PHILIP HEISIG
EVERETT R. PRICE

BY *Harmon, Pierce & Kurz*
ATTORNEY

United States Patent Office 2,980,914
Patented Apr. 25, 1961

2,980,914

COMBINED HEADGEAR AND EYESHIELD

Henry Philip Heisig, Solana Beach, and Everett R. Price, Escondido, Calif., assignors to Bill Jack Scientific Instrument Co., Solana Beach, Calif., a corporation of California Filed June 3, 1959, Ser. No. 817,844

11 Claims. (Cl. 2—10)

This invention relates generally to helmets for aviators and the like and more specifically to a combination headgear and eye shield.

The primary object of this invention is to provide a combined headgear and eye shield wherein the eye shield may be moved between the eye shielding position and a retracted position with the use of only one hand, leaving the other hand of an aviator free for the handling of his aircraft.

A more specific object of this invention is to provide a simple and effective means of mounting an eye shield on an aircraft helmet whereby the shield is easily shiftable by one hand about the mounting between plural positions relative to the helmet.

Another object of this invention is to provide a combined headgear and eye shield wherein the eye shield is so connected through a mounting to the covering of the headgear that it is movable about the mounting in plural planes.

A further object of this invention is to provide a novel mounting structure for an eye shield on a helmet covering wherein the eye shield is movable about the mounting structure in plural planes, and wherein the mounting structure is provided with indexing and locking features to position and hold the eye shield in plural positions.

Another object of this invention is to provide a combined headgear and eye shield wherein the eye shield is connected to the headgear through pivotal mountings in such a manner as to be swingable by one hand in a plane transverse to the headgear between a retracted position and an eye shielding position.

With the foregoing and other objects in view the invention resides in the following specification and appended claims, certain embodiments and details of construction being illustrated in the accompanying drawings in which:

Figure 3 is a view similar to Figure 1 with the shield turned one hundred eighty degrees from the eye shielding position of Figure 1;

Figure 4 is a view similar to Figure 3 but illustrating the shield pivoted into a locked retracted position adjacent the headgear covering;

Figure 1:
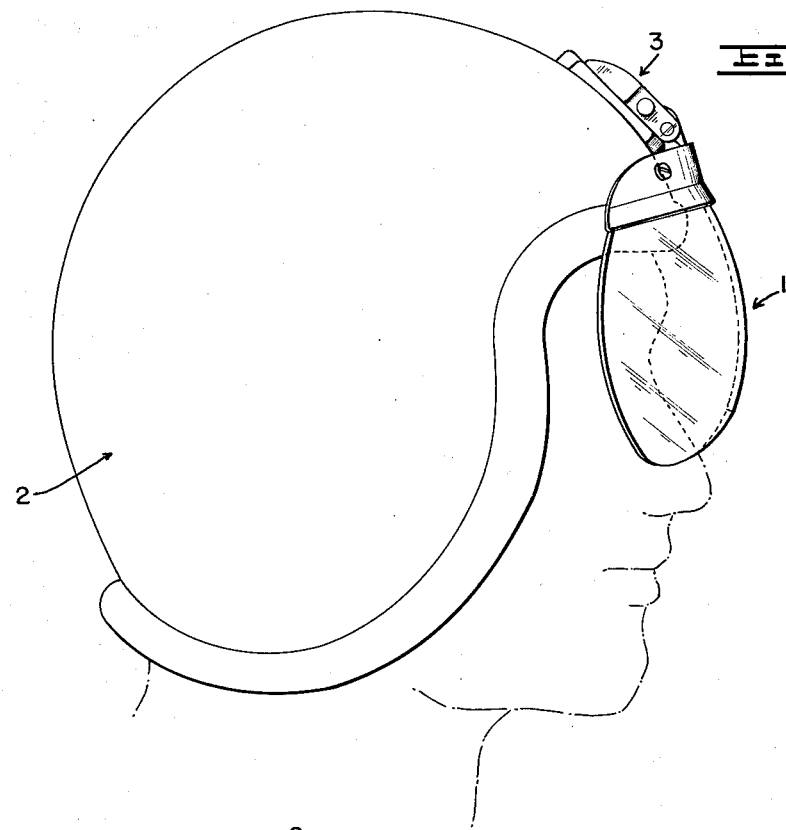
Figure 1 is a view in side elevation of the combined headgear and eye shield comprising the invention with the shield illustrated in a locked shielding position.
Figure 2:
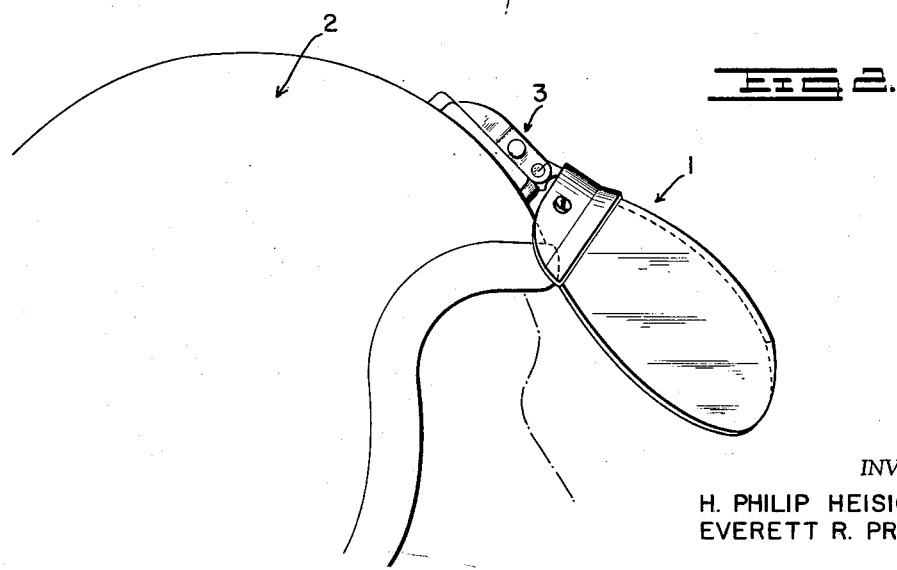
Figure 2 is a view similar to Figure 1 but illustrating the shield pivoted forwardly of the headgear.

Referring more particularly to the drawings, Figures 1 through 4 illustrate four specific positions that an eye-shield 1 may assume in being moved between an eye shielding position, as in Figure 1, and a retracted position, as in Figure 4 relative to a standard, well known type of headgear or helmet 2. Interconnecting the shield 1 with the headgear 2 is a mount generally indicated at 3. The mount 3 provides a simple pivotal structure, to be later fully described, which permits a type of swivel action of the shield in plural planes, to facilitate movement of the shield by the use of one hand of the pilot between the retracted and eye shielding positions. Thus, when the shield is in the position of Figure 1 and the wearer wishes to move the same to the retracted position of Figure 4, he merely uses a one hand manipulation of structure (to be described) in mount 3 to cause the shield 1 to snap to the position of Figure 2 in a movement about a pivot axis of mount 3 and describing a plane of movement coincident with a vertical plane through the longitudinal axis of the headgear 2. The mount 3 is secured to the headgear 2 at a point which may be defined as being coincident with a vertical plan through the central, longitudinal axis of the headgear. With the shield 1 in the position of Figure 2 the wearer need only use one hand to rotate the shield about mount 3 in a plane transverse to the vertical plane through the longitudinal axis until the shield is positioned as in Figure 3. Again using but one hand the shield may be depressed to the locked retracted position of Figure 4 by moving the same downwardly in a vertical plane of movement about the mount 3. While making the above shield position changes with only one hand the wearer continues to have one hand free to operate his aircraft or other vehicle.

Figure 5:
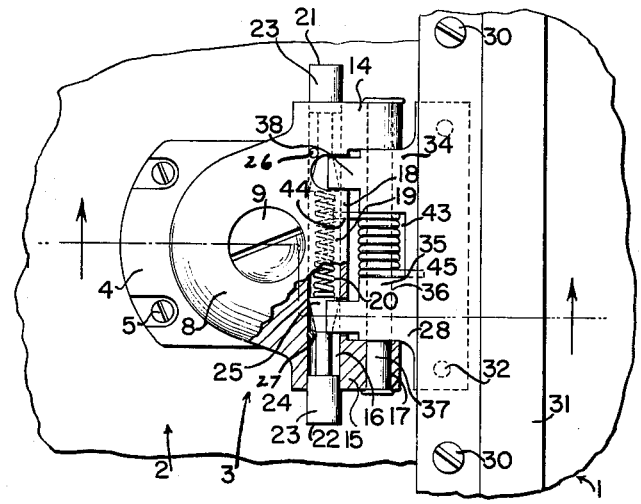
Figure 5 is a fragmentary plan view of the mounting unit interconnecting the eye shield and the headgear.
Figure 6:
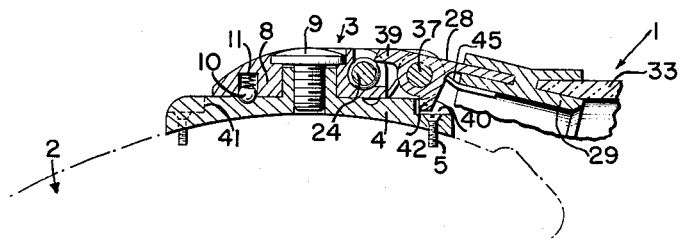
Figure 6 is a sectional view in side elevation taken along the lines 6—6 of Figure 5 illustrating the shield connecting plate in a locked position.
Figure 7:
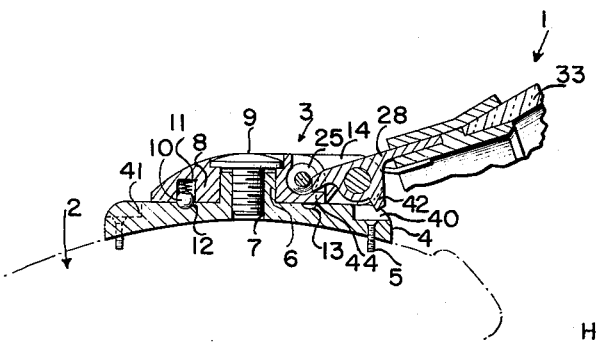
Figure 7 is a view similar to Figure 6 but illustrating the shield connecting plate in an unlocked position.

The mount unit 3 is fully illustrated in Figures 5, 6 and 7. A base plate 4 is secured as by screws 5 to the covering of headgear 2. The plate 4 is provided with an integral upstanding boss 6 which is provided with a tapped opening 7. The axis of the opening 7 is made substantially coincident with a vertical plane through the central, longitudinal axis of the headgear 2 when plate 4 is secured to the headgear by screws 5.

A movable plate 8 is mounted above plate 4 in sliding contact therewith. Plate 8 is provided with a generally central aperture 9 of substantially the same diameter as that of boss 6 so that plate 8 may be pivotedly moved relative to plate 4 about boss 6 as a bearing surface. A retaining bolt 9 threaded into tapped opening 7 is utilized to prevent separation of the plates 8 and 4. To index the movable plate 8 on the stationary base plate 4, a spring loaded ball detent unit 10 is provided in recess 11 of plate 8 to cooperate with dimples 12 and 13 on plate 4. As illustrated, two such indexing points are provided and they coincide with either the shielding or retracted positions of the eye shield 1.

The plate 8 is provided with a pair of spaced arms 14 and 15. Each arm is provided with a pair of openings 16 and 17 aligned with similar openings in the other arm. Plate 8 is further provided with a projection 18 having a central passage or opening 19 which is coaxial with openings 16 in arms 14 and 15. Positioned in opening 19 during assembly is a coil spring 20. Positioned for reciprocatory movement in openings 16 is a pair of lock pins 21 and 22. Each lock pin is provided with a bearing section 23 of somewhat similar but less diameter than an opening 16 to have free sliding relationship therein. Each pin is further provided with a reduced diameter portion 24 between the bearing section and an enlarged, tapered end portion 25. In assembly each lock pin is inserted into an opening 16 in opposed relationship and in contact with opposite ends of compression spring 20. Stop pins 26 and 27 are then driven through suitable openings in plate 8 to prevent removal of pins 21 and 22 from openings 16.

Cooperatively associated with plate 8 is a combination hinge and lock plate 28. Plate 28 is secured by rivets at 32 or other means to one clamping member 29 for the shield 1. Screws 30 secure a second clamping member 31 over a portion of plate 28 in a sandwich relationship. The body portion 33 of the shield 1 is securely clamped between the clamping members 29 and 31 on the opposite side from the plate 28.

The plate 28 includes a pair of spaced legs 34 and 35 which are each provided with a bored passage 36 to coaxially align with passages 17 in arms 14 and 15 of plate 8. A pivot pin 37 extends through the passages 17 and 36 to pivotedly secure the plate 28 to the plate 8. Pin 37 is peened over at either end to prevent accidental removal from the assembly. Legs 34 and 35 are provided with forward projections 38 and 39, respectively, which extend into the spaces between arms 14 and 15 and the projection 18 of plate 8. These projections 38 and 39 engage the upper surface of tapered sections 25 of pins 21 and 22 as in Figure 6 to prevent pivotal action of plate 28 about pivot pin 37. The base plate 4 is provided with notches 40 and 41 to receive an integral locking lug 42 on the under side of plate 28 when the plate 28 is in the position of Figure 6. The notches 40 and 41 in plate 4 correspond to the shielding and retracted positions of the shield relative to the headgear 2. Wrapped about the pin 37 between the arms 34 and 35 is a coiled spring 43 having one end 44 engaging under projection 18 of plate 8 and the other end 45 engaging under clamping members 29 of the shield. The spring 43 is placed under initial pressure during assembly to bias the plate 28 and shield 1 counterclockwise as viewed in Figures 6 and 7. However, such movement is prevented by the engagement of projections 38 and 39 on the tapered sections 25 of pins 21 and 22, as viewed in Figure 6 thereby locking the shield against pivotal movement. Simultaneously, the lug 42 engages notch 40 to lock the plate 8 against movement about pivot boss 6 of base plate 4. The wearer of the headgear may then simultaneously apply two fingers of one hand to the protruding portions of lock pins 21 and 22 to exert a squeezing action thereon against the bias of spring 20. Thereupon each tapered section 25 of the pins 21 and 22 is moved inwardly of the passage 19 to a position whereby projections 38 and 39 are then opposite reduced diameter sections 24 of the said pins. As soon as the projections 38 and 39 clear the tapered sections 25, the end portions thereof will clear the reduced diameter portions of pins 21 and 22 and the spring 43 will snap the plate 28 and shield 1 in a counterclockwise direction to the position of Figure 7. The arc of movement by plate 28 is then arrested by engagement of projections 38 and 39 against portion 44 of plate 8. It will be obvious that with the plate 28 in position of Figure 7, the lug 42 is disengaged from notch 40 so that plate 8 may now be rotated about boss 6. When the shield 1 is rotated to either the retracted or the shielding position, it is only necessary for the wearer to overcome the force of detent 10 initially. Then the plate 8 will rotate freely until detent 10 engages the dimple 12 or 13 to reindex the plate in a new position. When this position is reached, the wearer need then only to depress the shield 1 against the bias of spring 43 to return said shield to the position of Figure 6, which may be either the fully retracted position or the shielding position.

In summary it will now be obvious to one skilled in the art that the invention provides a novel and improved combination headgear and eye shield wherein a single mounting fixture is utilized to effectively position and lock the shield relative to the headgear in either the retracted or shielding positions. The wearer needs only to depress a pair of spring loaded lock pins with one hand to automatically release the shield from a securely locked position on the headgear. Once released from such a position, the shield is rotatable about the mount to an indexed point corresponding to another locked position relative to the headgear. Then by merely depressing the shield against the bias of a spring, the shield will again be securely locked in the newly selected position.

It is realized that the exact details of the mount structure may be subject to many modifications well within the purview of this invention and a reasonable interpretation of the appended claims.

We claim:

1. A combined headgear and eye shield comprising a head covering having a longitudinal axis extending from the front to the rear of the covering and covering substantially the entire head of a wearer except for a facial, front opening therein in a plane generally normal to the longitudinal axis, an eye shield, having a curved contour generally complementary to the contour of the covering, and a mounting means securing said shield to said covering, said mounting means including a base plate secured to the covering, a first pivot means positioned normally to the plate and to the covering and located in a vertical plane through longitudinal axis of the covering so that the eye shield may be moved about the first pivot means in a plane transverse to said vertical plane, a first movable plate mounted in sliding contact with the base plate for rotary movement about said first pivot means, a second movable plate, means connecting the eye shield to said second movable plate, second pivot means connecting said second movable plate to said first movable plate so that the eye shield may be moved about said second pivot means in a plane transverse to movement of said shield about said first pivot means, locking lug means between said second movable plate and said base plate, biasing means to normally urge disengagement of said locking lug means, and releasable locking means to hold said locking lug means engaged to prevent movement of either of said movabe plates.

2. The invention according to claim 1 wherein an indexing means is provided between said first movable plate and said base plate to position said eye shield in plural positions when moved about said first pivot means.

3. A combined headgear and eye shield comprising a head covering having a longitudinal axis extending from the front to the rear of the covering and covering substantially the entire head of a wearer except for a facial, front opening therein in a plane generally normal to the longitudinal axis, an eye shield having a curved contour generally complementary to the contour of the covering, a mounting means securing said shield to said covering, said eye shield being movable on the mounting means from a retracted position, where the shield is retained in a position adjacent to the covering in a substantially parallel relationship therewith, to a shielding position adjacent the front, facial opening so that the shield substantially closes a portion of the opening in a complementary manner with the covering or visa-versa by a first movement in and restricted to a vertical plane coincident with the longitudinal axis of the helmet, a second movement in and generally limited to a plane transverse to the vertical plane through the covering and a third movement in and restricted to the said vertical plane, and positive means provided in said mounting means to restrict the first and third movements to the vertical plane.

4. The invention according to claim 3 wherein the positive means provided in said mounting means comprises a detent means to index the shield in the vertical plane eye shielding and retracted positions.

5. The invention according to claim 4 wherein a locking means is provided on the mounting means to lock the shield in the indexed retracted position and in the indexed shielding position.

6. A combined headgear and eye shield comprising a head covering having a longitudinal axis extending from the front to the rear of the covering and covering substantially the entire head of a wearer except for a facial, front opening therein in a plane generally normal to the longitudinal axis, an eye shield having a curved contour generally complementary to the contour of the covering, a mounting means securing said shield to said covering, said mounting means including a base plate secured to the covering, a first pivot means positioned normally to the base plate and to the covering and located in a vertical plane through the longitudinal axis of the covering so that the eye shield may be moved about the first pivot means in a plane transverse to said vertical plane, a first movable plate mounted in sliding contact with the base plate for movement about said first pivot means, a second movable plate, means connecting the eye shield to the second movable plate, and second pivot means connecting said second movable plate to said first movable plate so that the eye shield may be moved about the second pivot means in a plane transverse to movement of said shield about said first pivot means, said eye shield thereby being movable on the mounting means from a retracted position, where the shield is retained in a position adjacent to the covering in a substantially parallel relationship therewith to a shielding position adjacent the front, facial opening so that the shield substantially closes a portion of the opening in a complementary manner with the covering or visa-versa by a first movement in and restricted to the vertical plane about said second pivot means, a second movement in and generally limited to a plane transverse to the vertical plane about said first pivot means, and a third movement in and restricted to the vertical plane about said second pivot means, and positive means provided in said mounting means to restrict the first and third movements to the vertical plane.

7. The invention according to claim 6 wherein the range of movement of said second movable plate about said second pivot means is limited by positive stop means.

8. The invention according to claim 6 wherein the positive means provided in said mounting means comprises a detent means to index the shield in the vertical plane eye shielding and retracted positions.

9. The invention according to claim 6 wherein a releasable locking means is provided between said second movable plate and said base plate to prevent movement of said eye shield about either pivot means when the shield is in either the retracted or the eye shielding position.

10. The invention according to claim 8 wherein a releasable locking means is provided between said second movable plate and said base plate to prevent movement of said eye shield from an indexed position about either pivot means.

11. A combined headgear and eye shield comprising a head covering having a longitudinal axis extending from the front to the rear of the covering and covering substantially the entire head of a wearer except for a facial, front opening therein in a plane generally normal to the longitudinal axis, an eye shield having a curved contour generally complementary to the contour of the covering, mounting means attached to the covering in a vertical plane through the longitudinal axis of the covering above said facial opening for securing said shield to said covering, said mounting means including plural pivot means about which said eye shield may be moved in plural planes between an eye shielding position and a retracted position, and releasable locking means engaging one of the pivot means to prevent movement of the eye shield from the retracted or the shielding position in any plane until said locking means is released.

References Cited in the file of this patent

UNITED STATES PATENTS

| | | |
|---|---|---|
| 1,671,342 | Cantor | May 29, 1928 |
| 2,030,639 | Kahn | Feb. 11, 1939 |
| 2,270,238 | Clarke et al. | Jan. 20, 1942 |
| 2,445,203 | Bowers | July 13, 1948 |
| 2,468,683 | Michal | Apr. 26, 1949 |
| 2,585,849 | Ryman | Feb. 12, 1952 |